(12) United States Patent
Storm

(10) Patent No.: US 7,832,756 B2
(45) Date of Patent: Nov. 16, 2010

(54) STROLLER

(75) Inventor: Gerjan Storm, Eindhoven (NL)

(73) Assignee: Cosco Management, Inc., Wilmington, DE (US)

( * ) Notice: Subject to any disclaimer, the term of this patent is extended or adjusted under 35 U.S.C. 154(b) by 301 days.

(21) Appl. No.: 12/105,734

(22) Filed: Apr. 18, 2008

(65) Prior Publication Data

US 2008/0258436 A1  Oct. 23, 2008

(30) Foreign Application Priority Data

Apr. 20, 2007  (NL)  .................................... 1033729

(51) Int. Cl.
*B62B 1/00* (2006.01)
(52) U.S. Cl. .................. 280/642; 280/650; 280/647
(58) Field of Classification Search ................. 280/642, 280/650, 647, 652, 651, 658, 47.38
See application file for complete search history.

(56) References Cited

U.S. PATENT DOCUMENTS

| | | | |
|---|---|---|---|
| 6,102,431 A * | 8/2000 | Sutherland et al. .......... | 280/642 |
| 6,991,248 B2 * | 1/2006 | Valdez et al. ............... | 280/647 |
| 7,077,420 B1 | 7/2006 | Santoski | |
| 7,237,795 B2 * | 7/2007 | Wu ............................ | 280/651 |
| 7,367,581 B2 * | 5/2008 | Yang .......................... | 280/642 |
| 7,591,479 B2 * | 9/2009 | Golias ........................ | 280/647 |
| 7,677,590 B2 * | 3/2010 | Dotsey et al. ............... | 280/642 |
| 2007/0257471 A1 * | 11/2007 | Myers et al. ................ | 280/642 |
| 2007/0290485 A1 * | 12/2007 | Nolan et al. ................ | 280/642 |
| 2008/0093824 A1 * | 4/2008 | Chen et al. .................. | 280/642 |

FOREIGN PATENT DOCUMENTS

| | | |
|---|---|---|
| DE | 20203348 | 8/2002 |
| EP | 09663332 | 7/1995 |
| WO | 9962753 | 12/1999 |

OTHER PUBLICATIONS

International Search Report dated Dec. 7, 2007, for NL 1033729, eight pages.

* cited by examiner

*Primary Examiner*—Hau V Phan
(74) *Attorney, Agent, or Firm*—Barnes & Thornburg LLP

(57) ABSTRACT

A stroller comprising at least one seat assembly, a first part comprising at least one front wheel, a second part comprising at least one rear wheel, and a third part comprising at least one push rod provided with a handle, at least two of which parts are each provided with at least one toothing which is pivotable about a pivot pin. The toothings are in mesh with each other, thus pivotally interconnecting the three parts. The second part comprises an arcuate rod, which is provided with at least one rear wheel at both ends, which arcuate rod is pivotally connected to the first part and the third part between its two ends.

11 Claims, 9 Drawing Sheets

STROLLER

The invention relates to a stroller comprising at least one seat assembly, a first part comprising at least one front wheel, a second part comprising at least one rear wheel, and a third part comprising at least one push rod provided with a handle, at least two of which parts are each provided with at least one toothing which is pivotable about a pivot pin, which toothings are in mesh with each other, thus pivotally interconnecting the three parts.

With such a stroller, which is known from EP-A1-0 090 668, the seat assembly is provided on either side thereof with a first part comprising a front wheel and a second part comprising a rear wheel. The stroller is further provided with a U-shaped push bracket comprising two push rods and a handle extending between said push rods. The push rods extend towards said first and second parts on either side of the seat assembly. Disposed on either side of the seat assembly is a support, to which a second part and a push rod are connected by means of toothings that pivot about pivot pins. Due to the provision of the U-shaped push bracket as well as the pairs of meshing toothings located on either side of the seat assembly, the stroller is of relatively complex construction.

The object of the present invention is to provide a stroller of comparatively simple construction, in which the parts can pivot in a controlled manner relative to each other.

This object is accomplished with the stroller according to the invention in that the second part comprises an arcuate rod, which is provided with at least one rear wheel at both ends, which arcuate rod is pivotally connected to the first part and the third part between its two ends.

Since the pivotable connection between the parts is located between the two ends provided with rear wheels, the stroller has only one pair of meshing toothings instead of two pairs of toothings which are spaced relatively far apart, as is the case with the stroller that is known from EP-A1-0 090 668. Because of this feature, the stroller according to the invention is of relatively simple construction. Moreover, a single, simple push rod which is pivotally connected with the first and the second part will suffice. This feature, too, leads to a compact stroller.

One embodiment of the stroller according to the invention is characterised in that the arcuate rod is provided between the two ends thereof with the toothing that is pivotable about the pivot pin.

The toothing, which is preferably centrally disposed between the rear wheels, makes it possible to realise a symmetric construction of the stroller, so that the stroller will have an aesthetically attractive appearance. In addition, substantially equal forces will be exerted on the stroller from either side during use of the stroller.

It is noted that with a stroller which is known from DE-UI-202.03.384, the seat assembly and the three parts are pivotable about a central axis, so that the stroller can be pivoted from an unfolded position to a collapsed position, in which the seat assembly and the three parts are positioned relatively close together.

Since the seat assembly and the three parts are pivotable about a central axis, pivoting said seat assembly and said parts in a controlled manner relative to each other is relatively complex.

One embodiment of the stroller according to the invention is characterised in that one of said parts is provided with a support, in which the pivot pins of the toothings are mounted.

Since one of the parts is provided with the support to which the toothings are pivotally connected, a univocal position of the three parts relative to each other is ensured in a simple manner.

Yet another embodiment of the stroller according to the invention is characterised in that the first part is provided with said support on a side remote from the front wheel, whilst the second and the third part are each provided with said toothing on a side remote from the rear wheels and from the handle, respectively.

In this way the second and the third part are pivotally connected to the first part, with the meshing toothings of the second and the third part univocally defining the positions of the second and the third part relative to the first part.

Yet another embodiment of the stroller according to the invention is characterised in that the third part comprising the push rod is pivotable in a direction away from the second part, towards the first part, whilst the second part is pivotable in a direction towards the first part.

A user pivots the push rod in the direction of the front wheel, preferably after having released a locking mechanism, with the toothings causing the rear wheel to pivot likewise in the direction of the front wheel. Such a manner of collapsing is relatively simple for a user.

Yet another embodiment of the stroller according to the invention is characterised in that the seat assembly comprises a seat portion and a backrest which is pivotally connected to the seat portion, which backrest can be pivoted to a position opposite the seat portion.

In this position the seat assembly takes up relatively little space, which further adds to the compactness of the stroller in the collapsed position.

Yet another embodiment of the stroller according to the invention is characterised in that the seat assembly is pivotally connected to said parts.

In the unfolded position of the stroller, the seat assembly can thus take up a suitable position relative to said parts in which the child can be comfortably seated in the seat assembly, whilst in the collapsed position of the stroller the seat assembly can take up a position relative to said parts in which the stroller is in its most compact position.

Yet another embodiment of the stroller according to the invention is characterised in that the seat assembly is provided with a toothing which is pivotable about a pivot pin, which toothing is in mesh with the toothing connected to one of said parts.

In this way also the pivoting of the seat assembly is effected by means of a toothing, which pivoting takes place in dependence on the pivoting of the other parts.

Preferably, the pivot pin of the toothing connected to the seat assembly is mounted in said support, just like other pivot pins.

Yet another embodiment of the stroller according to the invention is characterised in that the toothing connected to the seat assembly is in mesh with the toothing connected to the second part.

As a result, the seat assembly will likewise be pivoted in the direction of the front wheel when the rear wheel is moved in the direction of the front wheel.

Yet another embodiment of the stroller according to the invention is characterised in that the stroller can be locked at least in an unfolded position or in a collapsed position.

As a result, pivoting of the parts will only take place after the locking mechanism has been released, thus preventing undesirable collapsing or unfolding of the stroller.

The invention will now be explained in more detail with reference to the drawings, in which.

Like parts are indicated by the same numerals in the figures.

Figure 1A:
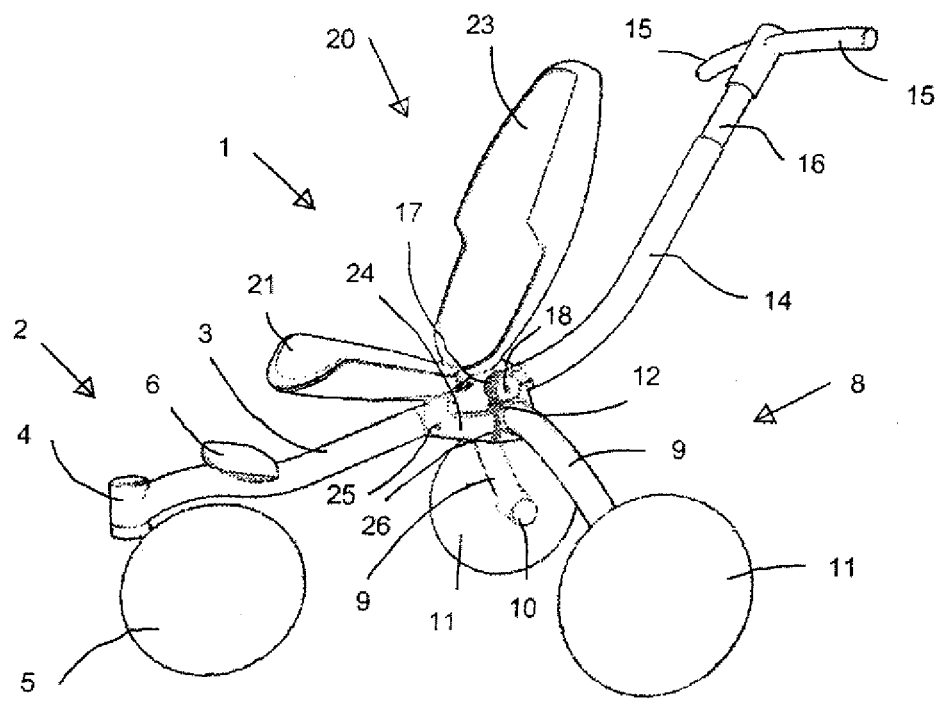
FIGS. 1a and 1b are a perspective view and a partially sectional side view of the stroller according to the invention in an unfolded position thereof.
Figure 1B:
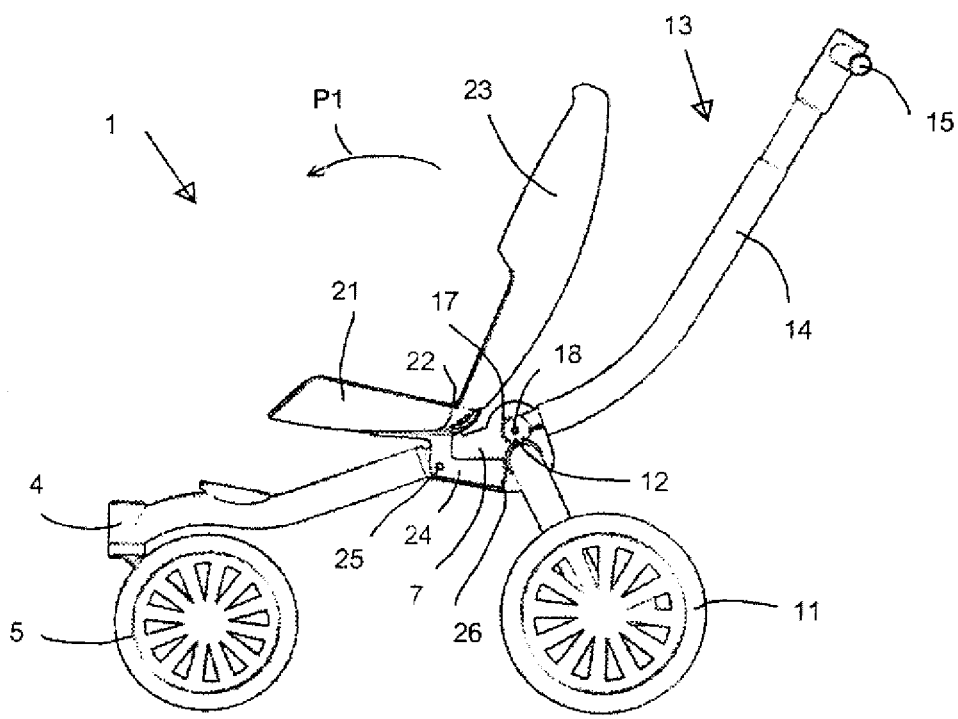

FIGS. 1a and 1b are a perspective view and a partially cross-sectional side view of a stroller 1 according to the invention. The stroller 1 has a first part 2 comprising a rod 3, which is provided at one end thereof with a front wheel 5 which is pivotally mounted in a bushing 4. A footrest 6 is connected to the rod 3 near the front wheel 5. The rod 3 is provided with a plate-shaped support 7 at its end remote from the front wheel 5.

The stroller 1 further has a second part 8 comprising an arcuate rod 9, which is provided at both ends thereof with rear wheels 11 which are rotatably connected to the rod 9 by means of a pivot pin 10. The rod 9 extends through the support 7 near its centre and is supported therein.

Near the support 7, the rod 9 is provided with a gear 12 comprising a toothing, which gear is rigidly connected to the rod 9.

The stroller 1 further has a third part 13 comprising a push rod 14. The push rod 14 is provided at one end thereof with handles 15 and with a telescopic element 16 by means of which the length of the push rod 14 can be adjusted. On a side remote from the handles 15, the push rod 14 is provided with a gear 17 comprising a toothing, which gear is pivotally connected to the support 7 by means of a pivot pin 18. The gear 17 of the third part 13 is in mesh with the gear 12 of the second part 8.

The stroller 1 further comprises a seat assembly 20, which comprises a seat portion 21 and a backrest 23 which is pivotally connected to the seat portion 21 by means of a pivot pin 22. On a side remote from the backrest 23, the seat portion 21 is provided with an L-shaped arm 24, which is pivotally connected to the support 7 by means of a pivot pin 25. On a side remote from the seat portion 21, the L-shaped arm is provided with a toothing 26, which is in mesh with the gear 12 of the second part 8.

FIGS. 1a and 1b show the stroller 1 according to the invention in an unfolded position, in which a child can be seated on the seat portion 21 and be supported against the backrest 23 with its back. The child's feet are supported by the footrest 6. The seat assembly 20 may be provided with seat belts, if desired, by means of which the child can be secured in the seat.

Figure 2A:
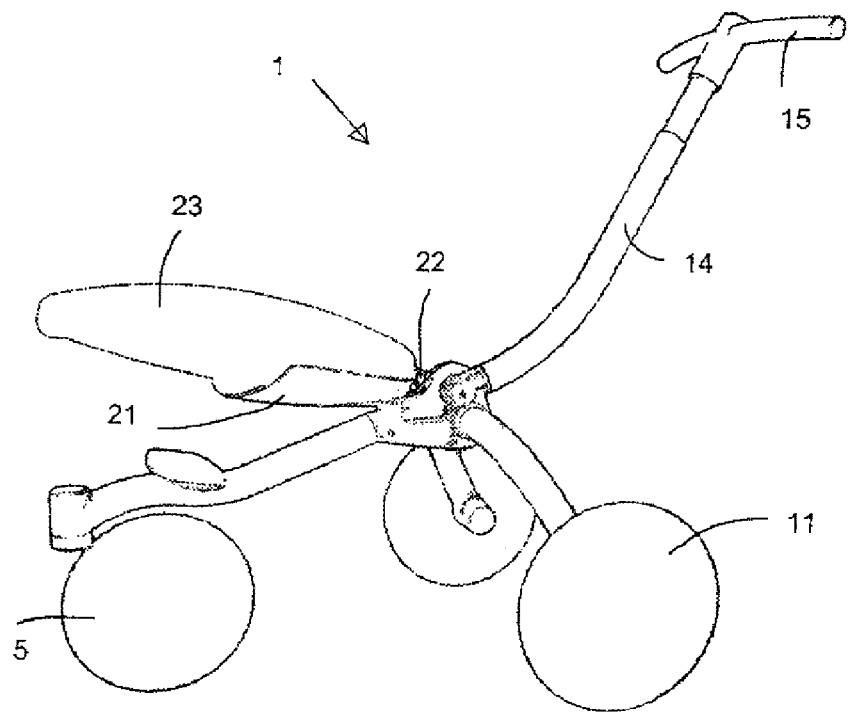
FIGS. 2a and 2b are a perspective view and a partially sectional side view of the stroller according to the invention in an unfolded position thereof, with the seat assembly in a collapsed position.
Figure 2B:
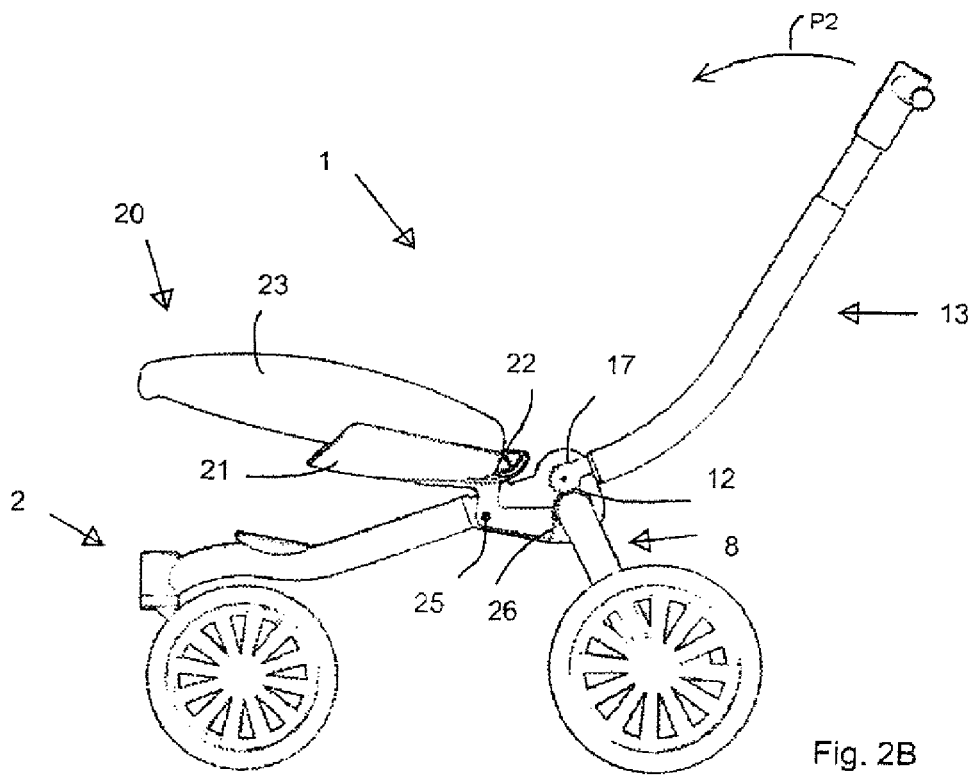

To collapse the stroller 1, the user will pivot the backrest 23 in the direction indicated by the arrow P1 about the pivot pin 22 to the position shown in FIGS. 2a and 2b.

Figure 3:
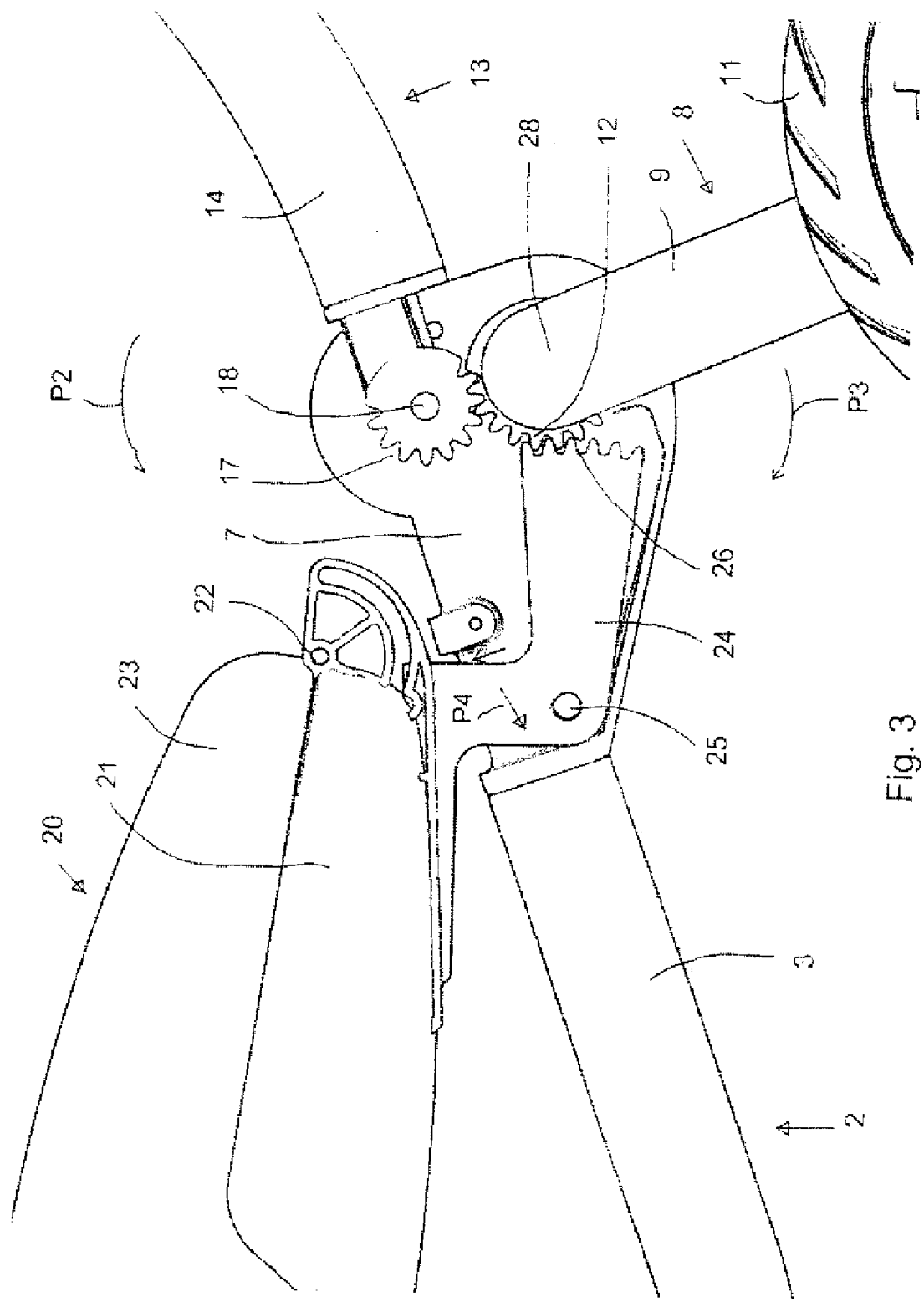
FIG. 3 is a larger-scale detail view of the stroller of FIG. 2b.

As is clearly shown in FIGS. 2a and 2b, and in particular in FIG. 3, the backrest 23 is positioned opposite and preferably in abutment with the seat portion 21 in this position, so that the seat assembly is comparatively compact.

The seat portion 21 and the backrest 23 are preferably made of plastic shells, which make it possible to realise a strong yet comfortable support of the child.

As FIG. 3 clearly shows, the toothings 12, 17, 26 are in mesh with each other.

To collapse the stroller 1 further, the user will release a locking mechanism, after which the user will push the push rod in the direction indicated by the arrow P2. This causes the push rod 14 to pivot about the pivot pin 18, with the gear 17 driving the gear 12, which gear 12 is thus rotated in the direction indicated by the arrow P3 about the pivot pin 28 together with the rear wheels 11 connected to the gear 12 via the rod 9. Because the gear 12 is in mesh with the toothing 26 of the L-shaped arm 24, the L-shaped arm 24 is thereby pivoted in the direction indicated by the arrow P4 about the pivot pin 25.

Figure 4A:
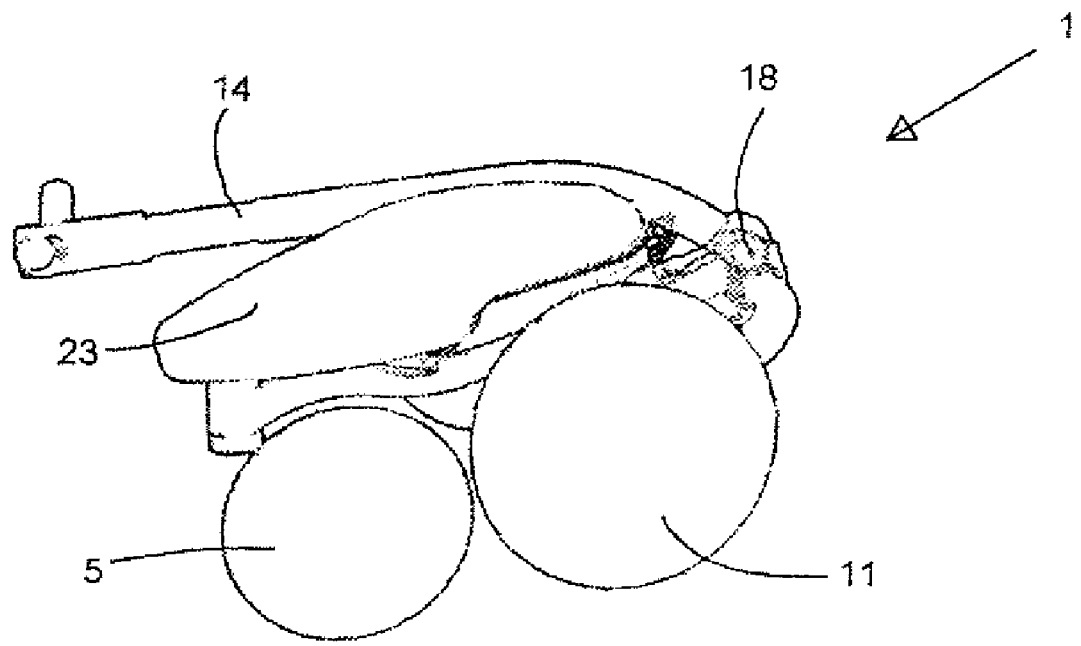
FIGS. 4a and 4b are a perspective view and a partially sectional side view of the stroller according to the invention in a collapsed position thereof.
Figure 4B:
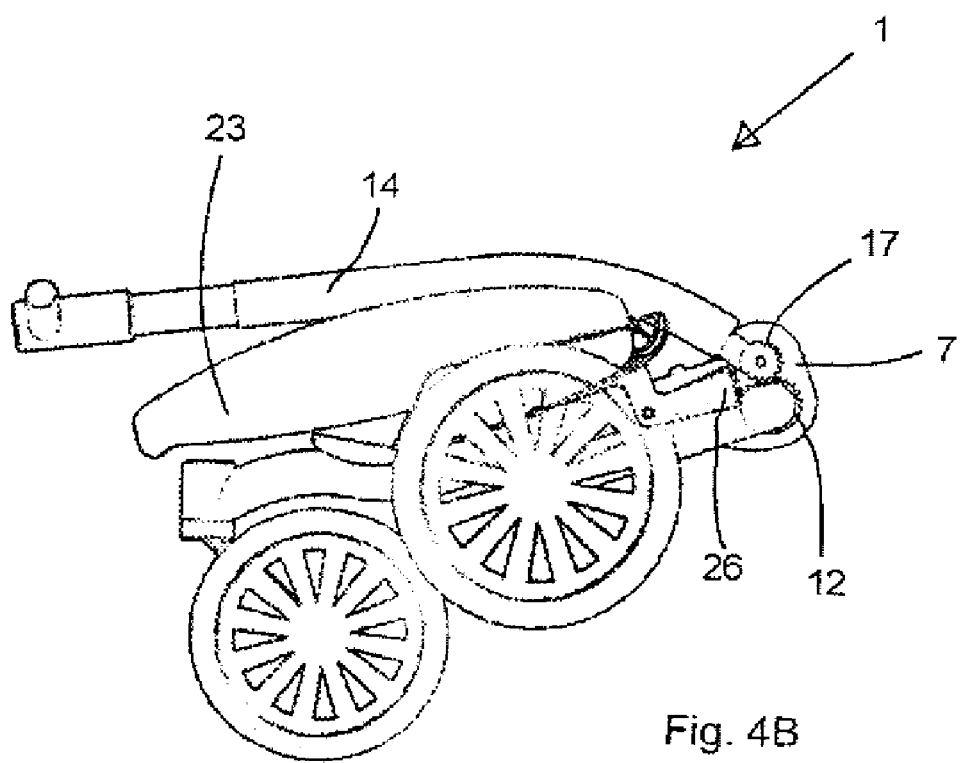

The push rod 14 is pivoted in the direction indicated by the arrow P2 until further pivoting of the seat assembly 20 and the parts 2, 8, 13 relative to each other is no longer possible and the stroller 1 has taken up the collapsed position shown in FIGS. 4a and 4b. In this position, the rear wheels 11 are positioned relatively close to the front wheel 5, whilst the seat portion 21 is positioned close to the rod 3 and the push rod 14 is positioned opposite the backrest 23.

Figure 5:
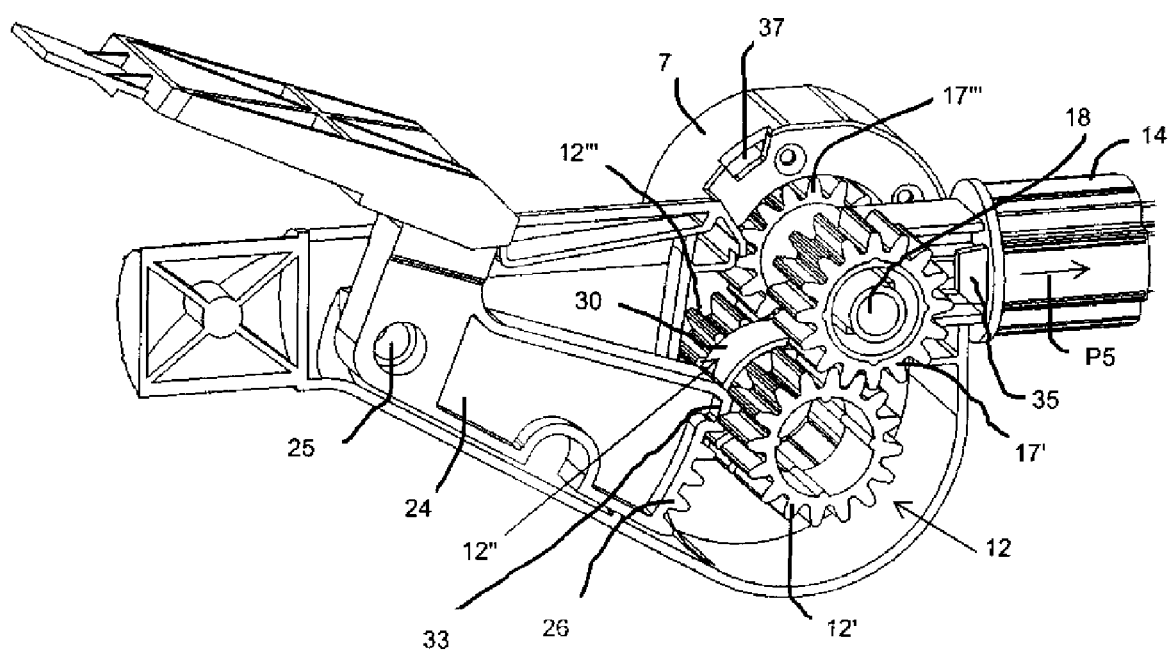
FIG. 5 is a larger-scale perspective view of the connection between the first, the second and the third part of another embodiment of the stroller according to the invention.
Figure 6A:
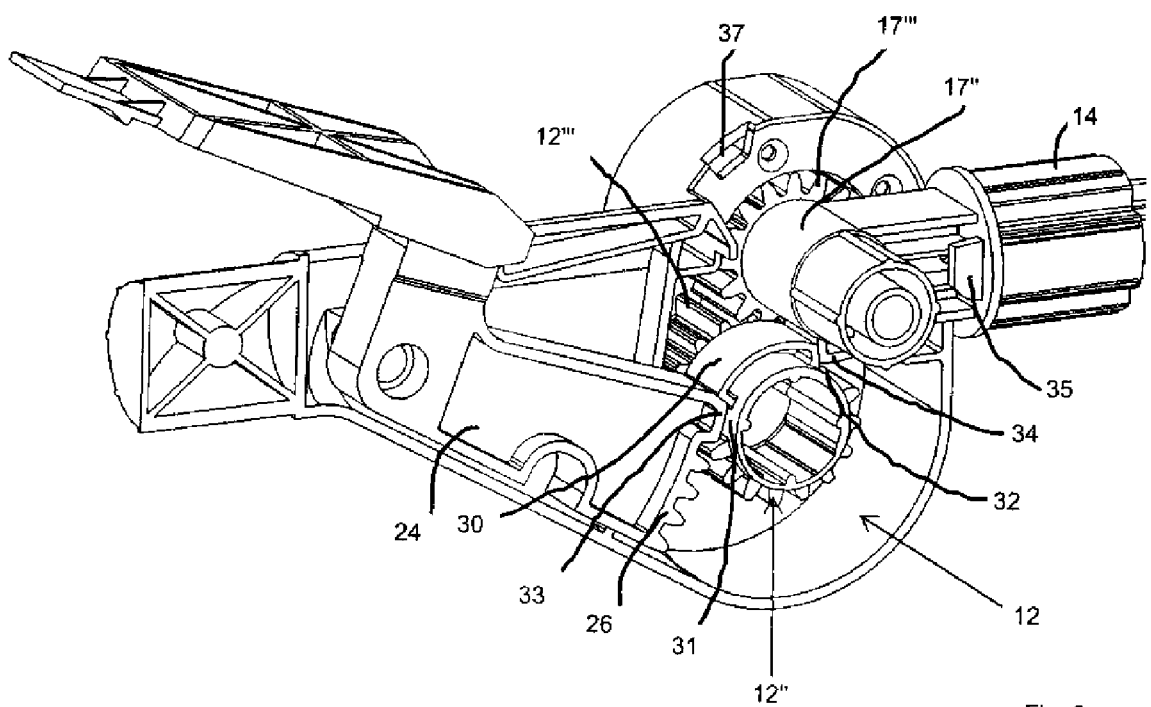
FIGS. 6a and 6b are a perspective view and a side view, respectively, of a detail of the connection shown in FIG. 5.
Figure 6B:
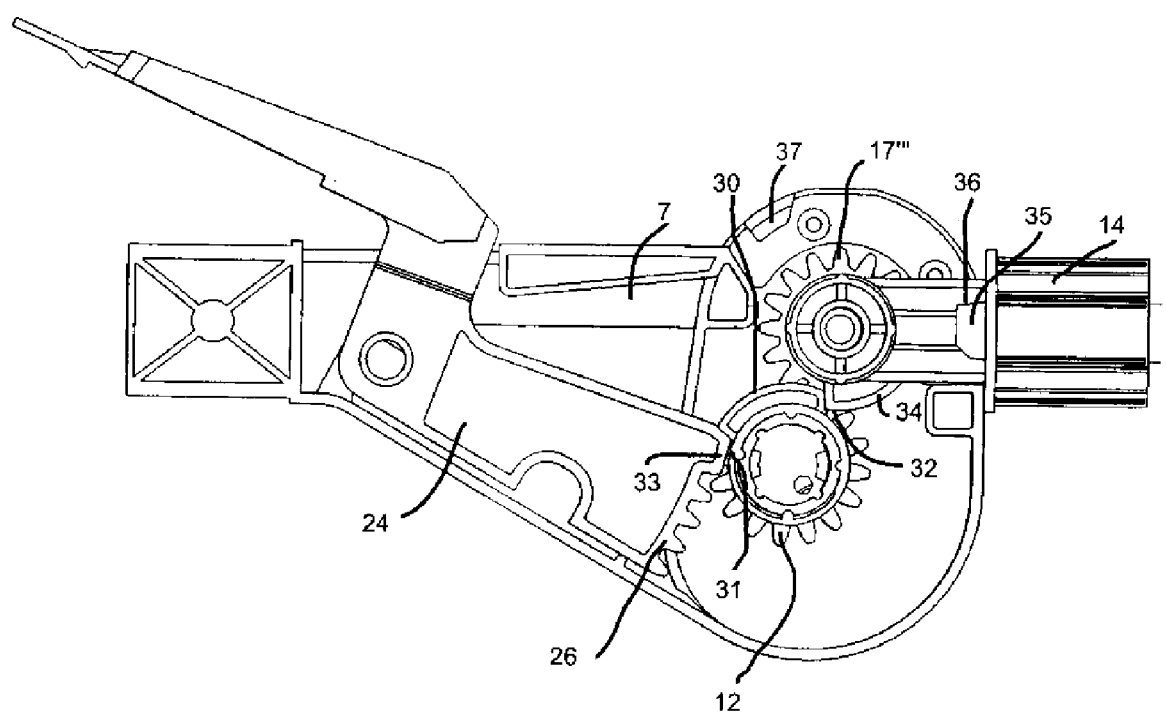
Figure 7:
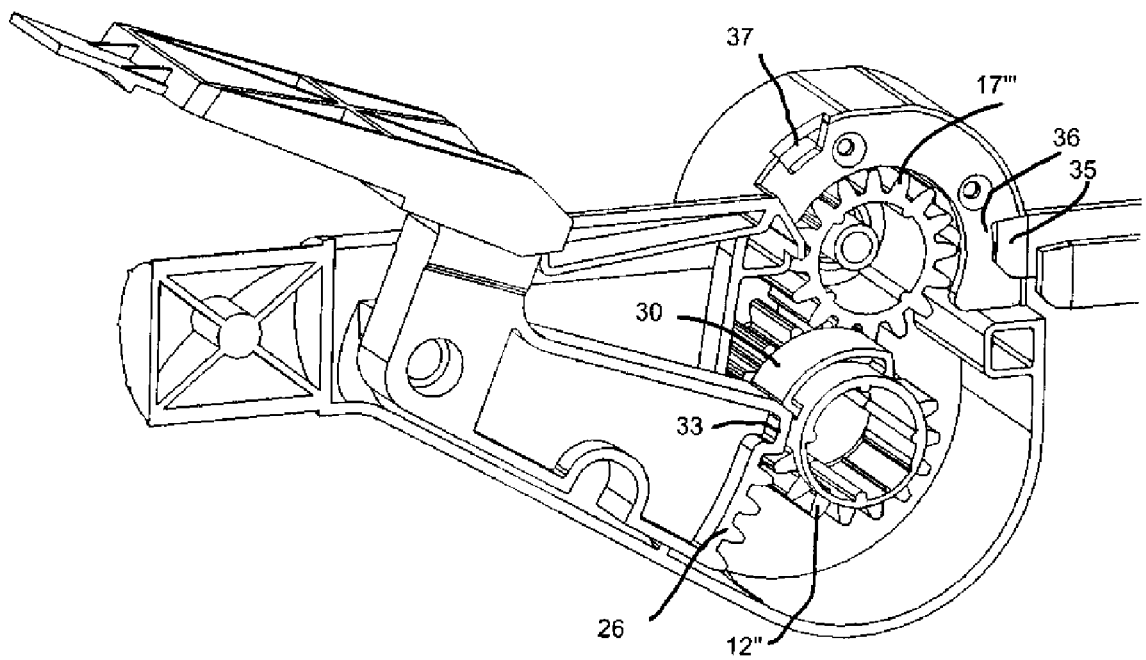
FIG. 7 is a perspective view of a part of the connection shown in FIG. 5.

FIGS. 5-7 show various views of another embodiment of the stroller 1 according to the invention, in which in particular the connection between the first part 2, the second part 8 and the third part 13 is differently configured. The gear 12 connected to the second part 8 is provided with two gears 12', 12''', which are each circumferentially provided with evenly spaced teeth. The gear 12 is further provided with a gear 12'' positioned between the gears 12' and 12''', which gear 12'' is provided with a number of teeth extending parallel to the teeth of the gears 12' and 12''', a relatively large tooth 30 and recesses 31, 32 located on either side of the large tooth 30. On a side remote from the seat portion 21, the L-shaped arm 24 is provided with the toothing 26, which mates with the relatively fine toothing on the gear 12''. The L-shaped arm 24 is further provided with a relatively large tooth 33, which, in the unfolded position shown in FIGS. 5-7, abuts against the tooth 30. As a result, a firm connection and contact is realised between the gear 12 and the L-shaped arm 24.

Similarly to the gear 12, the gear 17 connected to the push rod 14 is provided with two gears 17' and 17''', which are in mesh with the gears 12' and 12''', and with a segment 17'', which is positioned between the gears 17' and 17'''. The segment 17'' is provided with a single tooth-shaped element 34, which, in the unfolded position of the stroller shown in FIGS. 5-7, abuts against the tooth 30 of the gear 12'' on a side remote from the tooth 33.

In the embodiment shown in FIGS. 5-7, the stroller 1 is provided with a locking mechanism disposed between the push rod 14 and the support 7. Said locking mechanism comprises a slide 35, which is supported for sliding movement against spring force in the direction indicated by the arrow P5 in the push rod 14. The support 7 comprises spaced-apart recesses 36, 37, in which the slide 35 can be positioned in the unfolded position and in the collapsed position, respectively, of the stroller 1. In this way the stroller 1 is prevented from collapsing and unfolding, respectively, in a simple manner. Collapsing or unfolding the stroller 1 is only possible when a user moves the slide 35 against spring force in the direction indicated by the arrow P5. The operation of the slide 35 can for example be effected by means of a cable or other operating mechanism.

Figure 8:
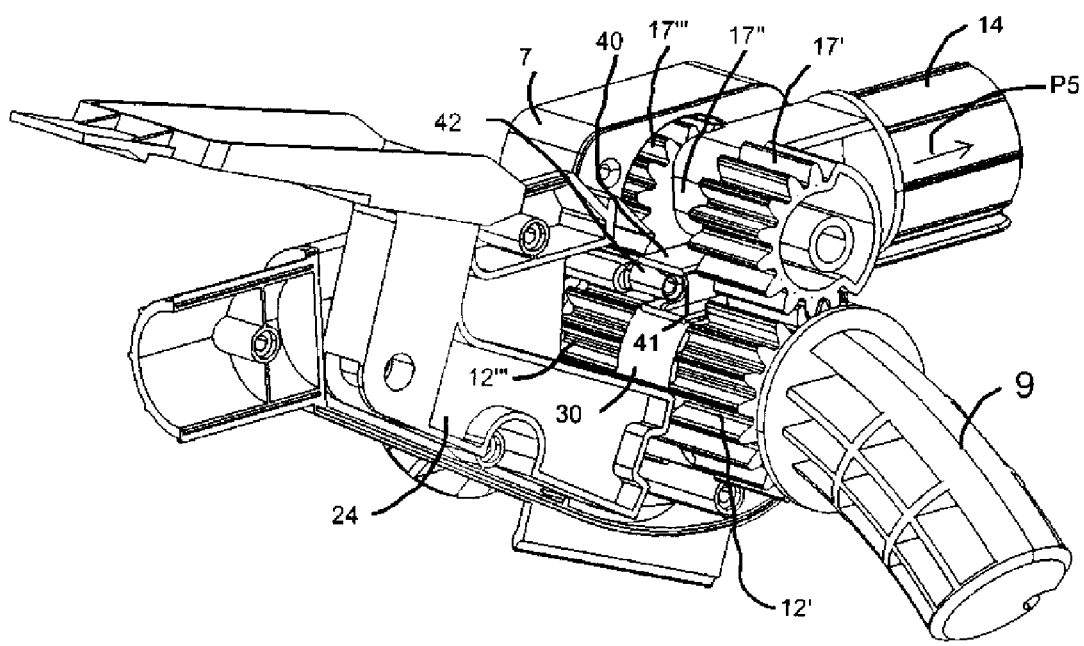
FIG. 8 is a perspective view of a detail of a third embodiment of a stroller according to the invention.

FIG. 8 shows another embodiment of a locking mechanism, in which a slide 40 is slidably supported in the push rod 14, being movable against spring force In the direction indicated by the arrow P5. On a side remote from the push rod 14, the slide 40 is provided with a recess 41, which engages round a pin 42 which is rigidly connected to the support 7. By connecting the slide 40 to the pin 42, the gears are locked relative to each other in the unfolded position of the stroller 1. Disconnecting the slide 40 from the pin 42 enables the gears to pivot relative to each other, making it possible to collapse the stroller 1. After the stroller 1 has been collapsed, the slide 40 can be brought into engagement with the pin 42 or with another pin for locking the stroller 1 in the collapsed position.

It is also possible, of course, to pivot only the first, second and third parts 2, 8, 13 relative to each other, in which case the seat assembly 20 will have a fixed position relative to, for example, the first part 2.

It is also possible to provide the seat assembly 20 or the second part 8 or the third part 13 with the support instead of the first part 2, and to provide the other parts with the toothings.

It is also possible to provide a spring between the seat portion 21 and the backrest 23, in which case the backrest is swung open by the spring upon pivoting of the push rod 14 in the opposite direction of the arrow P2. Upon collapsing, the push rod 14 will move the backrest 23 against spring force towards the seat portion 21 in that case.

It is also possible to build up the arcuate rod 9 of two arcuate segments, which are interconnected via the gear 12.

It is also possible to configure the rear wheels 11 as castor wheels.

The invention claimed is:

1. A stroller comprising at least one seat assembly,
   a first part comprising a front wheel,
   a second part comprising a rear wheel, and
   a third part comprising a push rod provided with a handle,
     each of the first, second and third parts are provided with at least one toothing which is pivotally mounted, each of the first, second, and third toothings being coupled to each other such that each of the first, second, and third toothings are in mesh with another of the of the first, second, and third toothings, thus pivotally interconnecting the first, second, and third parts, characterised in that the second part comprises an arcuate rod having two ends, which second part is provided with at least one rear wheel at both ends, which arcuate rod is pivotally connected to the first part and the third part between its two ends.

2. A stroller according to claim 1, characterised in that the arcuate rod is provided between the two ends thereof with the toothing that is pivotable.

3. A stroller according to claim 2, characterised in that said toothing is disposed substantially centrally between the rear wheels.

4. A stroller according to claim 1, characterised in that one of said parts is provided with a support, in which the toothings are pivotally mounted.

5. A stroller according to claim 4, characterised in that the first part is coupled to said support at a location remote from the front wheel, whilst the second and the third part are each provided with said toothing at a location remote from the rear wheels and from the handle, respectively.

6. A stroller according to claim 4, characterised in that the third part comprising the push rod is pivotable in a counter-clockwise direction with respect to the support, whilst the second part is pivotable in a clockwise direction with respect to the support to move the stroller from an unfolded use position to a collapsed position.

7. A stroller according to claim 1, characterised in that the seat assembly comprises a seat portion and a backrest which is pivotally connected to the seat portion 8. A stroller according to claim 1, characterised in that the seat assembly is pivotally connected to said parts.

9. A stroller according to claim 8, characterised in that the seat assembly is provide with a toothing which is pivotable about a pivot pin, which toothing is in mesh with the toothing connected to one of said parts.

10. A stroller according to claim 9, characterised in that the toothing connected to the seat assembly is in mesh with the toothing connected to the second part.

11. A stroller according to claim 1, characterised in that the stroller can be locked in an unfolded position or in a collapsed position.

* * * * *